United States Patent [19]
Guiles, Jr.

[11] Patent Number: 5,538,471
[45] Date of Patent: Jul. 23, 1996

[54] DYNAMIC PARTICULATE CONTROL SYSTEM AND METHOD OF OPERATION

[75] Inventor: Ellis G. Guiles, Jr., Waco, Tex.

[73] Assignee: Innovative Air Systems, Inc., Richardson, Tex.

[21] Appl. No.: 340,063

[22] Filed: Nov. 15, 1994

[51] Int. Cl.⁶ ................................................. F24F 11/00
[52] U.S. Cl. .......................................... 454/238; 454/239
[58] Field of Search ................................... 454/238, 239, 454/187

[56] References Cited

U.S. PATENT DOCUMENTS

| | | | |
|---|---|---|---|
| 4,817,708 | 4/1989 | Ono et al. .................................. | 165/54 |
| 4,995,307 | 2/1991 | Floyd . | |
| 5,205,783 | 4/1993 | Diekert et al. ........................... | 454/238 |

FOREIGN PATENT DOCUMENTS

| | | | |
|---|---|---|---|
| 38541 | 3/1984 | Japan ...................................... | 454/238 |
| 59-95327 | 6/1984 | Japan . | |
| 59-205539 | 11/1984 | Japan . | |
| 60-62540 | 4/1985 | Japan . | |
| 64145 | 4/1985 | Japan ...................................... | 454/238 |
| 60-251338 | 12/1985 | Japan . | |
| 61-3933 | 1/1986 | Japan . | |
| 62-202936 | 9/1987 | Japan . | |
| 62-242756 | 10/1987 | Japan . | |
| 118046 | 5/1989 | Japan ...................................... | 454/238 |
| 200136 | 8/1989 | Japan ...................................... | 454/229 |

*Primary Examiner*—Harold Joyce
*Attorney, Agent, or Firm*—Baker & Botts

[57] ABSTRACT

A dynamic particulate control system (12) is provided for controlling particulate levels in a room (14). The dynamic particulate control system (12) includes a supply blower assembly (22) that has a supply blower (30). The supply blower assembly (22) draws outside air and provides supply air to the room (14) at a supply flow rate dependent upon an operation speed of the supply blower (30). A first variable frequency drive (32) controls the operation speed of the supply blower (30). A return blower assembly (58) has a return blower (64). The return blower assembly (58) draws return air from the room (14) and dissipates exhaust air outside the room (14) at an exhaust flow rate dependent upon an operation speed of the return blower (64). A second variable frequency drive (66) controls the operation speed of the return blower (64). A plurality of sensors (72 through 92) periodically sample and measure system conditions and provide status signals. A controller (68) receives and processes the status signals. The controller (68) generates and provides control signals for the variable frequency drives (32 and 66) such that particulate levels in the room are dynamically controlled to remain at or below desired concentrations.

21 Claims, 8 Drawing Sheets

5,538,471

DYNAMIC PARTICULATE CONTROL SYSTEM AND METHOD OF OPERATION

TECHNICAL FIELD OF THE INVENTION

This invention relates in general to the field of environmental control systems, and more particularly to a dynamic particulate control system and method of operation.

BACKGROUND OF THE INVENTION

Environment control systems are widely used to maintain ambient conditions within buildings and other structures. These systems include conventional heating and cooling systems as well as more sophisticated systems such as those used to maintain a "clean room" for semiconductor manufacturing processes. Environment control systems generally operate to draw air from within the structure, to process that air and to supply processed air back to the structure. In this manner, environment control systems maintain air conditions within the structure such that the environment is suitable for the structure's purpose.

One problem to which environment control systems have been applied is isolation rooms in health care facilities. It has become increasingly important for health care facilities to have the capability to effectively isolate patients to, for example, prevent the transfer of virulent agents. Possible methods include negative isolation to protect the medical staff and positive isolation to protect a patient. Conventional environment control systems adapted to health care isolation rooms maintain positive or negative pressure differentials in order to maintain the desired isolation. In order to achieve these pressure differentials, conventional systems control the volume of air supplied to the isolation room and to areas outside the isolation room.

A problem with conventional environment control systems is an inability to control particulate levels in a room. Conventional systems merely maintain the pressure differentials and trust that these pressure differentials will achieve a desired concentrations of particulates in a room. However, conventional environment control systems are unable to control particulate levels in a room as an ongoing, real-time process.

SUMMARY OF THE INVENTION

A need has arisen for an environmental control system that dynamically controls particulate levels in a room.

In accordance with the present invention, a dynamic particulate control system and method of operation are provided that substantially eliminate or reduce disadvantages and problems associated with conventional environmental control systems.

According to one embodiment in the present invention, a dynamic particulate control system is provided for controlling particulate levels in a room. The dynamic particulate control system includes a supply blower assembly that has a supply blower. The supply blower assembly draws outside/return air and provides supply air to the room at a supply flow rate dependent upon an operation speed of the supply blower. A first variable frequency drive controls the operation speed of the supply blower. A return blower assembly has a return blower. The return blower assembly draws return air from the room and dissipates exhaust air outside the room at an exhaust flow rate dependent upon an operation speed of the return blower. A second variable frequency drive controls the operation speed of the return blower. A plurality of sensors periodically sample and measure system conditions and provide status signals. A controller receives and processes the status signals. The controller generates and provides control signals for the variable frequency drives such that particulate levels in the room are dynamically controlled to remain at or below desired concentrations.

One technical advantage of the present invention is the control of an isolation room in a health care facility such that the air within the isolation room contains concentrations of particulates below desired levels. A dynamic particulate control system constructed according to the teachings of the present invention dynamically controls supply air to and return air from the isolation room responsive to monitored conditions. The environment in the isolation room is maintained such that an isolated patient is protected from contamination or such that the medical staff is protected from contamination by an isolated patient.

BRIEF DESCRIPTION OF THE DRAWINGS

A more complete understanding of the present invention and advantages thereof may be acquired by reference to the following description taken in conjunction with the accompanying drawings in which like reference numbers indicate like features and wherein.

DETAILED DESCRIPTION OF THE INVENTION

A dynamic particulate control system, constructed according to the teachings of the present invention, dynamically monitors and controls the conditions of the environment of a room. Typical controlled environments include an acid-fast bacilli (AFB) isolation room, a positive pressure isolation room, a special procedure room, an autopsy room, an operating suite, a clean room that might be used in industrial processing such as semiconductor system fabrication, animal laboratories and pharmaceutical laboratories.

Figure 1:
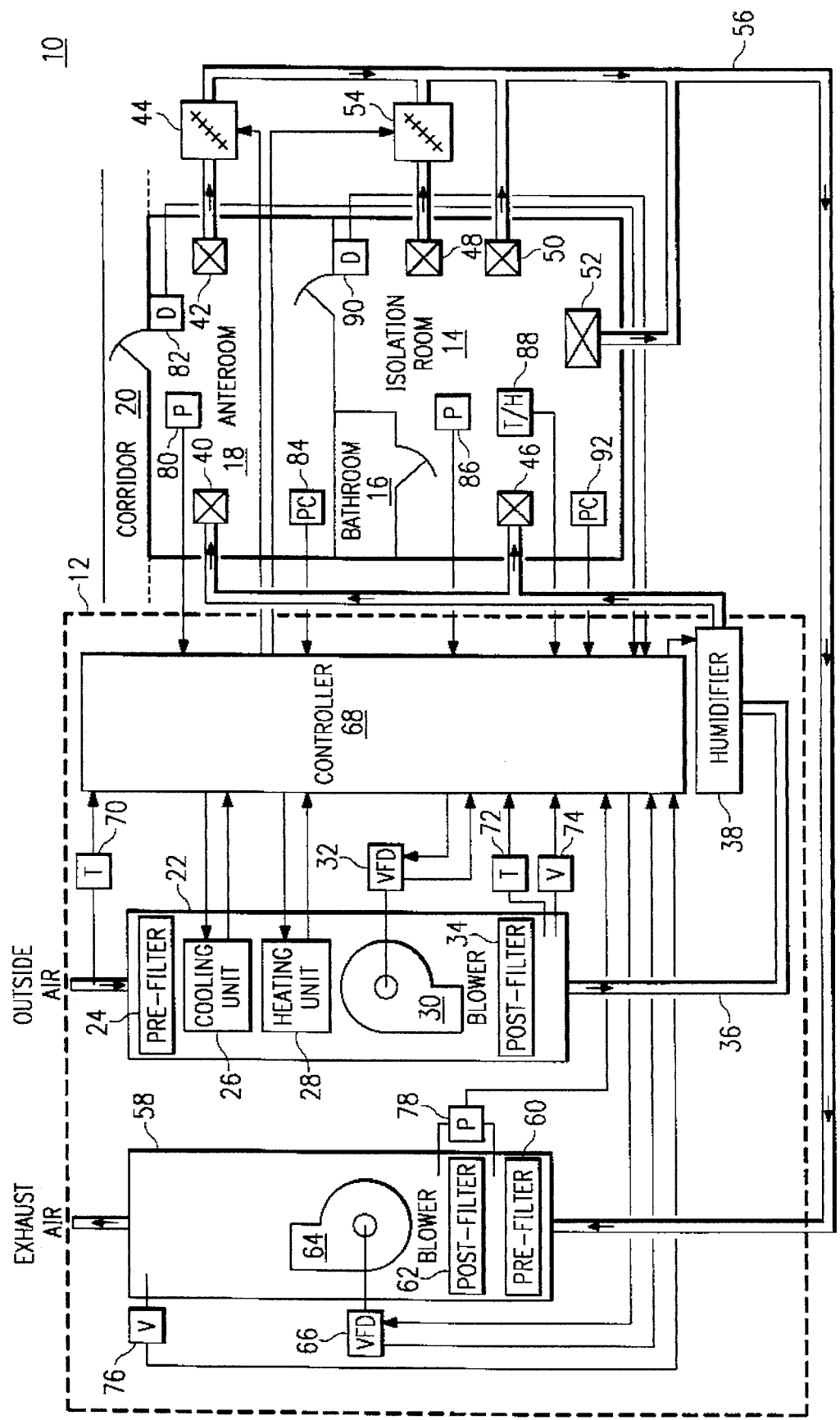
FIG. 1 is a block diagram of an isolation room controlled by a dynamic particulate control system constructed according to the teachings of the present invention.

FIG. 1 is a block diagram of an isolation room configuration 10. Configuration 10 will be described primarily with reference to a health care environment, although the systems described are not limited to application in this or any particular environment. A dynamic particulate control system 12, constructed according to the teachings of the present invention, monitors and controls conditions in an isolation room 14 and an anteroom 18. Isolation room 14 has a bathroom 16, as shown. Anteroom 18 separates isolation room 14 from a corridor 20 that provides access to other parts of an associated health care facility. In general, system 12 draws outside air, provides supply air, draws return air and dissipates exhaust air to dynamically control particulate levels.

System 12 includes a supply blower assembly 22. Supply blower assembly 22 comprises a pre-filter 24 that filters outside air. Supply blower assembly 22 also comprises a cooling unit 26 and a heating unit 28. Supply blower assembly 22 further comprises a supply blower 30 and a post-filter 34. A variable frequency drive 32 is coupled to supply blower 30. A supply air duct 36 couples supply blower assembly 22 to isolation room 14 and anteroom 18. As shown, a humidifier 38 is disposed along supply air duct 36.

Anteroom 18 has an inlet vent 40 coupled to supply air duct 36 and an outlet vent 42 coupled to a variable damper 44. Isolation room 14 has an inlet vent 46 coupled to supply air duct 36 and has an outlet vent 48, an outlet vent 50 and an outlet vent 52. Outlet vent 48 is coupled to a variable damper 54. Variable damper 44, variable damper 54, outlet vent 50 and outlet vent 52 are coupled to a return air duct 56, as shown.

System 12 includes a return blower assembly 58 coupled to return air duct 56. Return blower assembly 58 comprises a pre-filter 60 and a post-filter 62. Return blower assembly 58 also comprises a return blower 64. A variable frequency drive 66 is coupled to a return blower 64. Return blower assembly 58 dissipates exhaust air outside isolation room 14 and anteroom 18, as shown.

System 12 also includes a controller 68. In general, controller 68 receives a number of status signals and, using this information, generates and provides a number of control signals. A temperature sensor 70 monitors the outside air temperature and provides a status signal to controller 68 representing the temperature. A temperature sensor 72 monitors supply air exiting supply blower assembly 22 and provides a status signal to controller 68 representing the temperature of the supply air. An airflow velocity sensor 74 also monitors the supply air exiting supply blower assembly 22 and provides a status signal to controller 68 representing the rate of flow of the supply air. An airflow velocity sensor 76 monitors the exhaust air exiting exhaust blower assembly 58 and provides a status signal to controller 68 representing the rate of flow of the exhaust air. A pressure sensor 78 monitors the pressure drop across post-filter 62 and provides a status signal to controller 68 representing that pressure drop.

A pressure sensor 80 and a door sensor 82 are located in anteroom 18 and provide status signals to controller 68. Pressure sensor 80 monitors the pressure of the air within anteroom 18 and provides a status signal representing that pressure. Door sensor 82 provides a status signal representing the state, open or closed, of the door to corridor 20. A particulate concentration sensor 84 also is located in anteroom 18 and provides a status signal to controller 68 representing the concentration of particulates in anteroom 18. A number of particulate concentration sensors may be included with each sensitive to different particulates. A pressure sensor 86 and a temperature/humidity sensor 88 are located in isolation room 14 and provide status signals to controller 68 representing the pressure and the temperature and humidity, respectively. A door sensor 90 is also located in isolation room 14 and provides a status signal to controller 68 representing the state of the door to anteroom 18. A particulate concentration sensor 92 is located in isolation room 14 and provides a status signal to controller 68 representing the concentration of particulates in isolation room 14.

Cooling unit 26 and heating unit 28 provide status signals to controller 68 representing conditions within each unit, respectively. Controller 68 further receives status signals from variable frequency drive 32 and variable frequency drive 66 representing the operation speed of supply blower 30, and exhaust blower 64.

Controller 68 receives and processes the various status signals discussed and provides a number of control signals. Controller 68 provides control signals to variable frequency drive 32 and to variable frequency drive 66. Controller 68 also provides control signals to variable damper 44 and variable damper 54. Controller 68 further provides control signals to humidifier 38, cooling unit 26 and heating unit 28.

In operation, dynamic particulate control system 12 dynamically controls particulate levels in isolation room 14 and anteroom 18 to maintain particulate levels within a range of desired concentration. In the illustrated embodiment, isolation room 14 is a negative pressure isolation room located in a health care facility. Corridor 20 provides access to other areas of the facility. Anteroom 18 separates isolation room 14 from corridor 20.

Supply blower 30 of supply blower assembly 22 operates to draw outside air and to provide supply air to isolation room 14 and anteroom 18. Supply blower 30 provides supply air at a variable flow rate dependent upon an operation speed of supply blower 30. Supply blower 30 draws the outside air through pre-filter 24, cooling unit 26 and heating unit 28.

Pre-filter 24 filters relatively large particles from the outside air. Cooling unit 26 and heating unit 28 condition the outside air as desired according to control signals provided by controller 68. Cooling unit 26 and heating unit 28 also provide status signals to controller 68 representing the state of cooling unit 26 and heating unit 28, respectively.

Supply blower 30 blows supply air through post-filter 34 and through supply air duct 36 to provide supply air to isolation room 14. Post-filter 34 comprises a high efficiency particulate air filter. In one embodiment of the present invention, post-filter 34 comprises a 99.9% efficient, to 0.12 microns, high efficiency particulate air filter (HEPA).

Variable frequency drive 32 controls the operation speed of supply blower 30 to provide variable settings for supply blower 30. Variable frequency drive 32 provides a status signal to controller 68 representing the current operation speed of supply blower 30. The airflow velocity produced by supply blower 30 is variable dependent upon variable frequency drive 32. Variable frequency drive 32 operates responsive to the control signal provided by controller 68.

Temperature sensor 70 and temperature sensor 72 measure the temperature of the outside air and the supply air, respectively. Temperature sensor 70 and temperature sensor 72 then provide signals to controller 68 representing the measured temperatures. Airflow velocity sensor 74 measures the airflow velocity of the supply air in cubic feet per minute and provides a signal to controller 68 representing the airflow velocity.

Humidifier 38 operates to humidify supply air flowing through supply air duct 36. Humidifier 38 operates responsive to a control signal received from controller 68. Humidifier 38 is not a required element of system 12, but can be included or not included according to the desired application. After passing through humidifier 38, supply air flows through supply air duct 36 into anteroom 18 and isolation room 14.

Anteroom 18 receives supply air through inlet vent 40. Pressure sensor 80 measures the pressure of the air in anteroom 18, and provides a signal to controller 68 representing the measured pressure. Particulate concentration sensor 84 samples the air and measures the concentration of particulate levels in anteroom 18, and then provides a status signal to controller 68 representing the measured concentration. Door sensor 82 monitors the door between anteroom 18 and corridor 20. Door sensor 82 provides a signal to controller 68 representing the state of that door.

Return air exits anteroom 18 through outlet vent 42. Variable damper 44 receives a control signal from controller 68 and restricts the flow of return air from outlet vent 42 responsive to the control signal. In one embodiment of the present invention, variable damper 44 comprises a modulated damper or a two-position damper. The return air flows through return air duct 56 to return blower assembly 58.

Isolation room 14 receives supply air through inlet vent 46. Pressure sensor 86 measures the pressure of the air in isolation room 14 and provides a status signal to controller 68 representing the measured pressure. Temperature/humidity sensor 88 measures the temperature and humidity of the air in isolation room 14 and provides a status signal to controller 68 representing the measured values. Door sensor 90 monitors the state of the door between isolation room 14 and anteroom 18. Door sensor 90 provides a signal to controller 68 representing whether the door is open or closed. Particulate concentration sensor 92 samples the air in isolation room 14 and measures concentrations of particulates. Particulate concentration sensor 92 then provides controller 68 with a status signal representing the concentrations of measured particulates.

Return air exits isolation room 14 through outlet vent 48, outlet vent 50 and outlet vent 52. Return air exiting outlet vent 48 is restricted by variable damper 54 responsive to a control signal received from controller 68. In one embodiment of the present invention, variable damper 54 comprises a modulated damper or a two-position damper. Return air exiting isolation room 14 travels through return air duct 56 to return blower assembly 58, as shown.

Return blower assembly 58 operates to draw return air and to dissipate exhaust air into the outside environment. Return blower 64 operates under the control of variable frequency drive 66 to dissipate exhaust air at a variable flow rate. Variable frequency drive 66 sets the operation speed of return blower 64 responsive to the control signal received from controller 68. Pre-filter 60 and post-filter 62 filter the return air. In one embodiment of the present invention, post-filter 62 comprises a high efficiency particulate air filter having a 99.9% efficiency, to 0.12 microns.

Airflow velocity sensor 76 measures the airflow velocity of the exhaust air in cubic feet per minute, and provides a signal to controller 68 representing the measured value. Pressure sensor 78 monitors the pressure difference across post-filter 62 and provides a status signal to controller 68 representing that difference. The operation speed of return blower 64 is controlled by variable frequency drive 66. Variable frequency drive 66 receives a control signal from controller 68 and provides a status signal representing the current operation speed of return blower 64 to controller 68.

Controller 68 receives and processes the status signals from the numerous sensors monitoring system conditions. All of the sensors make measurements at a given frequency. In one embodiment of the present invention, each sensor provides a new status signal once every second. Controller 68 processes the status signals by comparing the status signals with pre-selected thresholds. Controller 68 then determines changes required to maintain desired particulate level concentrations and other conditions in isolation room 14 and anteroom 18. Controller 68 alters the control signals using appropriate logic functions with the status signals and the threshold values as inputs and the control signals as outputs. Control signals are provided to variable frequency drive 32, variable frequency drive 66, humidifier 38, variable damper 44, variable damper 54, cooling unit 26 and heating unit 28 to implement changes required to dynamically control particulate levels in isolation room 14 and anteroom 18.

Controller 68 can be coupled to a display or printer to provide status information as well as a magnetic storage device to provide long term data storage capability. Controller 68 can display desired system status information including alarms, isolation mode, supply and exhaust air flow, room temperature and humidity as supplied by the status signals.

A dynamic particulate control system, constructed according to the teachings the present invention, may be used in either single or multiple room applications. Further, because variable frequency drives are used for supply air and return air, it is not necessary to adjust these devices as filters get dirty. As pressure losses in the system increase due to dirt build-up, controller 68 automatically alters control signals to increase the operation speed set by the variable frequency drives to maintain supply and exhaust airflows at desired levels. A warning indicator can be generated when the filters are excessively dirty so that maintenance personnel may change the filters.

Cooling unit 26 may comprise chilled water coils with modulating valves or a DX refrigeration cycle, either air cooled or water cooled. Heating unit 28 may comprise hot water coils with modulating valves, steam coils with modulating valves or electric heaters with silicon controlled rectifier (SCR) control. Heating unit 28 is positioned in the reheat position after cooling unit 26. By positioning heating unit 28 in this location, it is possible to provide dehumidification control as well as heating control. Humidifier 38 is remote mounted and may comprise a steam-to-steam or self-contained electronic humidifier.

Dynamic particulate control system 12 dynamically controls the environment in anteroom 18 and isolation room 14 to provide controlled levels of air cleanliness. In one embodiment of the present invention, pre-filter 24 comprises a 35% efficient filter, and post-filter 34 comprises a 99.9% efficient, to 0.12 microns high efficiency particulate air filter. Similarly, pre-filter 60 comprises a 35% efficient filter, and post-filter 62 comprises a 99.9% efficient, to 0.12 micron, high efficiency particulate air filter. For some health care related applications of the present invention, ultraviolet (UV) germicidal lamps can be installed as part of post-filter 34 and post-filter 62. Further, bag-in/bag-out high efficiency particulate air filters can also be used where local regulatory codes or particular applications require them. Additionally, for applications where odor removal or removal of a particular airborne particulate is required, appropriate customized filtration can be provided.

Supply air flow, return air flow and the pressure in anteroom 18 and isolation room 14 are system conditions that are monitored and controlled by dynamic particulate control system 12. To ensure that these system conditions are properly controlled, variable frequency drives, solid state electronic thermal sensors for airflow velocity measurement, and pressure transducers can be employed.

The controller of a dynamic particulate control system of the present invention is provided with thresholds for the flow rate of supply air to be provided to the controlled environment, for the flow rate of return air removed from the controlled environment and for the pressure to be maintained in the controlled environment. In the illustrated embodiment of FIG. 1, controller 68 provides control signals to control the supply air delivered to and the return air extracted from isolation room 14 and isolation room 18 using variable frequency drives 32 and 66. Variable frequency drives 32 and 66 are coupled to the motors that drive supply blower 30 and exhaust blower 64, respectively, to control operation speeds. As monitored system conditions vary, controller 68 alters the control signals to cause variable frequency drive 32 and 66 to increase or decrease the operation speeds to maintain air flow requirements.

The pressure in isolation room 14 and anteroom 18 is a function of the supply air and return air provided to and drawn from these rooms. Dynamic particulate control system 12 monitors the pressure and varies the airflow velocities of the supply air and the return air to maintain the proper pressure in isolation room 14 relative to that in anteroom 18 and to that of an external reference point.

In some health care applications, maintaining the pressure of the controlled environment is considered vitally important. In the illustrated embodiment of FIG. 1, isolation room 14 has a negative pressure with respect to a positive pressure in anteroom 18 and a neutral pressure in corridor 20. This configuration protects medical staff from an isolated patient located in isolation room 14.

According to the teachings of the present invention, a wide range of system conditions are monitored in order to maintain dynamic control of the controlled environment. Consequently, the dynamic particulate control system can maintain a historical record of the performance of the controlled environment, provide warnings of system conditions outside of normal operating ranges, and provide an indication when maintenance needs to be performed. Properly located sensors are used to monitor system conditions. Conditions that can be monitored include, but are not limited to, (1) return air temperature/humidity, (2) controlled environment temperature, (3) outside air temperature, (4) exhaust air temperature, (5) inlet chilled water temperature when chilled water is used in the cooling unit, (6) outlet chilled water temperature when chilled water is used in the cooling unit, (7) inlet hot water temperature when hot water is used in the heating unit, (8) outlet hot water temperature when hot water is used in the heating unit, (9) high refrigerant pressure when DX cooling is used in the cooling unit, (10) low refrigerant pressure when DX coolant is used in the cooling unit, (11) pressure drop across all filtration components, (12) airflow velocity for both supply and return air, (13) pressure in the controlled environment, (14) percentage output of variable frequency drives, (15) variable frequency drive status, (16) smoke conditions in the controlled environment, (17) output intensity from UV germicidal lamps when used, and (18) inlet steam pressure when steam is used in the heating unit.

In one embodiment of the present invention, the dynamic particulate control system receives a number of status signals representing system conditions as shown in Table I, below. Further, the controller in the dynamic particulate control system processes those status signals and generates control signals as shown in Table I. The status signals are grouped in FIG. 1 along with corresponding control signals that are generated based upon those status signals. The controller comprises a general purpose digital computer operating to receive the status signals and to generate the control signals according to appropriate logic functions.

TABLE I

| CONTROL SIGNALS | STATUS SIGNALS |
| --- | --- |
| Chilled Water Valve | Remote On/Off Switch |
| Compressor Relay | Airflow Velocity |
| | Remote Setpoint |
| | Room Temperature/Humidity |
| | Outside Air Temperature |
| | Supply Air Temperature |
| | Compressor Low Pressure |
| | Compressor High Pressure |
| Supply Blower VFD Reset | Remote On/Off Switch |
| | Supply Blower VD Alarm |
| Return Blower VFD Reset | Remote On/Off Switch |
| | Return Blower VFD Alarm |
| Isolation Room Damper Open | Positive/Negative Switch |
| | Remote On/Off Switch |
| Isolation Room Damper Closed | Isolation Room Pressure |
| Anteroom Room Damper Open | Anteroom Pressure |
| Anteroom Room Damper Closed | |
| Condense Fan Relay | Condenser Pressure Switch |
| | Remote On/Off Switch |
| Supply Blower VFD | Supply Airflow Velocity |
| Supply Blower Contractor | Isolation Room Pressure |
| | Anteroom Pressure |
| | Airflow Sensor |
| | Smoke Sensor |
| | Supply Blower VFD Alarm |
| | Isolation Door State |
| | Anteroom Door State |
| | Positive/Negative Switch |
| | Remote On/Off Switch |
| Return Blower VFD | Return Airflow Velocity |
| Return Blower Contrator | Isolation Room Pressure |
| | Anteroom Pressure |
| | Airflow Sensor |
| | Smoke Sensor |
| | Return Blower VFD Alarm |
| | Isolation Door State |
| | Anteroom Door State |
| | Positive/Negative Switch |
| | Remote On/Off Switch |
| Heating Unit SCR | Remote On/Off Switch |
| Hot Water Valve | Airflow Velocity |
| Steam Valve | Remote Setpoint |
| Heater Relay | Room Temperature/Humidity |
| | Outside Air Temperature |
| | Supply Air Temperature |
| Humidifier(analog) | Airflow Velocity |
| Humidifier(digital) | Remote Setpoint |
| | Room Temperature/Humidity |
| | Outside Air Temperature |
| | Remote On/Off Switch |

Figure 2:
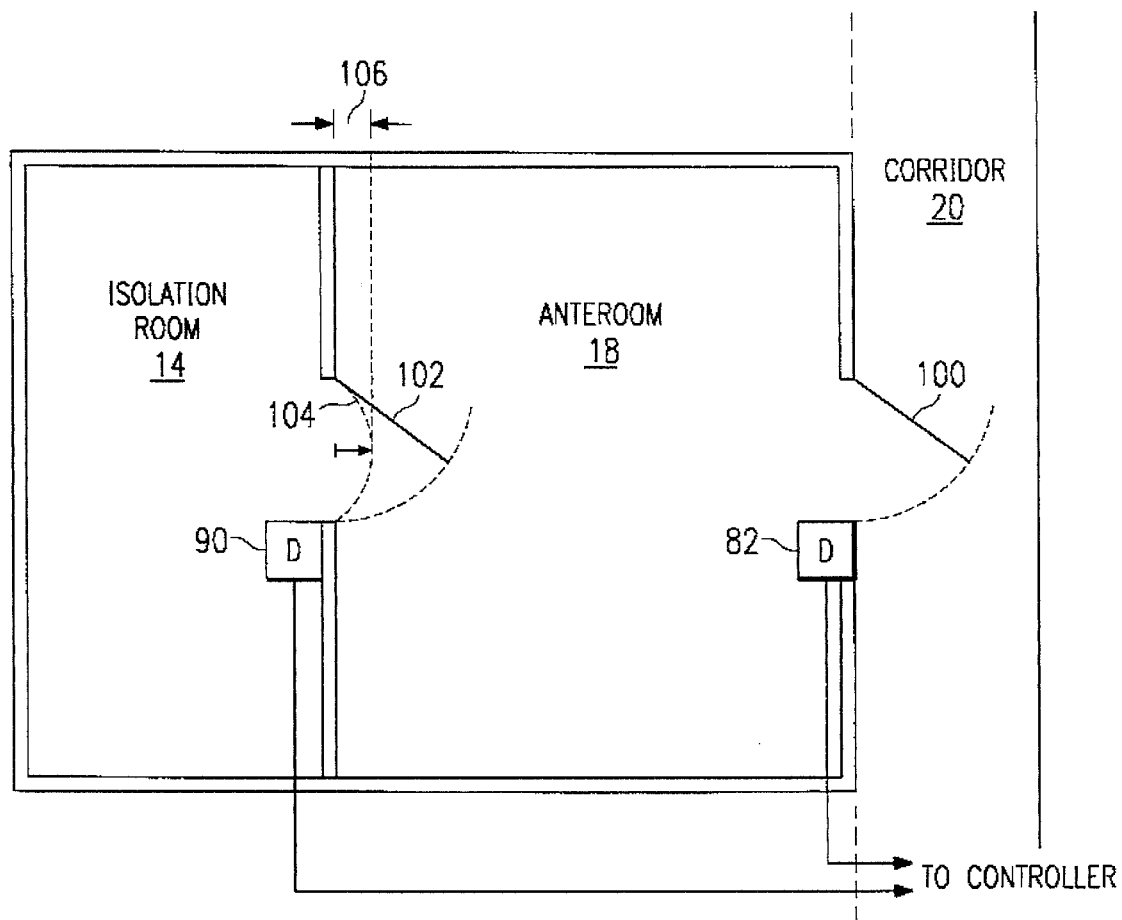
FIG. 2 illustrates a pressure bubble caused by opening to a door a negative pressure isolation room.

FIG. 2 illustrates a pressure bubble caused by opening the door to isolation room 14 of FIG. 1. In the illustrated embodiment, isolation room 14 has a negative pressure with respect to anteroom 18. Door sensor 82 monitors opening and closing of door 100 to anteroom 18, and door sensor 90 monitors opening and closing of door 102 between isolation room 14 and anteroom 18. Door sensor 82 and door sensor 90 provide status signals to controller 68 representing the state of door 100 and door 102, respectively.

When door 102 is opened, a pressure bubble 104 is formed that moves a distance 106 into anteroom 18. Controller 68 processes the status signals provides by door sensor 82 and door sensor 90 to interlock supply blower 30 and return blower 64. Controller 68 alters the operations speeds to respond to an opening of door 100 and in anticipation of the opening of door 102. The goal is to minimize distance 106 thus minimizing particulate transfer when door 102 is opened after isolation room 14 and anteroom 18 have been pressurized.

When door sensor 82 senses the opening of door 100, door sensor 82 informs controller 68. Controller 68 then alters control signals to ramp exhaust blower 64 to a higher operation speed and to slow supply blower 30 to a slower operation speed. This change anticipates the opening of door 102 and is an effort to maintain isolation room 14 at negative pressure with respect to anteroom 18 if door 102 is opened.

Door sensor 90 senses whether door 102 is opened. Door sensor 90 then sends a status signal to controller 68 indicating that door 102 has been opened. Controller 68 responds by continuing to ramp exhaust blower 64 and to slow supply blower 30. This process minimizes the distance 106 that pressure bubble 104 travels into anteroom 18. In one embodiment of the present invention, controller 68 returns to a normal state if door 102 is not opened within a specified period of time after door 100 is opened.

This interlocking of supply blower 30 and return blower 64 responsive to the state of doors 100 and 102 is important to preventing particulate transfer from isolation room 14 to anteroom 18. A similar interlock mechanism would benefit other embodiments of the present invention including an application where isolation room 14 has a positive pressure with respect to anteroom 18.

One application of a dynamic particulate control system, constructed according to the teachings of the present invention, is to control an environment to reduce the risk of exposure to tuberculosis in the workplace. The present invention affords levels of protection to employees that are reliable, consistent, and adequate. Further, the efficacy of the protection for each individual employee can be maintained during operation throughout the life span of the system. The present invention minimizes dependance on human intervention increasing its reliability. Isolation rooms and proper control of isolation rooms is a critical part of a properly implemented infection control program. However, many facilities do not have adequate numbers of isolation rooms, and those rooms that are set-up to be isolation rooms do not function properly. These conditions place other individuals, who come in contact with infected individuals, at increased risk of infection. A dynamic particulate control system, constructed according to the teachings of the present invention, dynamically maintains room pressurization and air changes per hour as system conditions that impact the system change over time.

Upon initiation of the dynamic particulate control system, the flow rate of supply air and exhaust air and the type of isolation desired are provided to the controller. Unless these thresholds are changed, the system will operate with these thresholds. Pressurization of the controlled room is an important control variable. The dynamic particulate control system will modulate the supply and exhaust airflow rates to maintain the proper pressurization in the controlled room. In one embodiment of the present invention, the system achieves twenty-two air changes per hour in a 960 cubic foot isolation room, with airflow rates of 350 CFM of exhaust air and 300 CFM of supply air. Additionally, proper placement of inlet and outlet vents is important to the elimination drafts in the patient room. In order to do so, outlet vents can be placed approximately six inches above the finished floor, preferably in the corners of the controlled room. By placing two inlet vents over a patient bed and two at diagonal corners of the controlled room, airflow rates of 15–16 FPM can be obtained thirty-six inches above the finished floor.

One important factor is to maintain the number of air changes per hour. Providing clean supply air causes dilution of infectious bacteria or other airborne particulates within the isolation room. Further, research has shown that temperature and humidity are important factors in the survival and viability of aerosolized microorganisms. Some microorganisms have been shown to survive and actually multiply at humidity levels below twenty percent, while others have demonstrated the same ability at levels above eighty percent. By controlling the temperature and humidity levels of the isolation room, better overall control of the environment within the room can be obtained.

One technical advantage of the present invention is the control of an isolation room in a health care facility such that the air within the isolation room contains concentrations of particulates below desired levels. A dynamic particulate control system constructed according to the teachings of the present invention dynamically controls supply air to and return air from the isolation room responsive to monitored conditions. The environment in the isolation room is maintained such that an isolated patient is protected from contamination or such that medical staff is protected from contamination by an isolated patient.

FIGS. 3A and 3B illustrate a flow chart of a door interlock process according to the teachings of the present invention. This door interlock process allows the dynamic particulate control system to interconnect control of an isolation room and an anteroom based upon the status of the doors to each room.

The door interlock process begins at step 110 in FIG. 3A. In step 110, the control system determines whether the isolation room status is positive pressure or negative pressure. If the isolation room status is negative, the control system determines whether the anteroom door status is closed or open in step 112. If the anteroom door is closed, the control system returns to step 110. If the anteroom door is open, the control system increases the exhaust fan speed for the isolation room in step 114. The control system then monitors the isolation room door status in step 116. If the isolation room door status is closed, the control system determines whether two minutes have elapsed in step 118. If two minutes have not elapsed, the control system returns to step 114. If two minutes have elapsed, the control system returns to normal exhaust fan control for the isolation room in step 120. In step 122, the control system initiates an alarm indicating that the anteroom door has been left open and returns to step 110.

If the isolation room door is open in step 116, the control system determines whether the isolation room pressure is negative or positive in step 124. If the isolation room pressure is negative, the control system determines the anteroom door status in step 126. If the anteroom door is closed, the control system returns to normal exhaust/supply fan control in step 128. The control system then returns to main room processing in step 130. If the anteroom door is open, the control system initiates an alarm in step 132 and returns to step 124 as shown by label "2".

If in step 124, the isolation room pressure is positive then the control system determines whether the exhaust fan is at 100% of capacity in step 134. If not, then the control system increases the exhaust fan in step 136. In step 138, the control system determines whether the exhaust air velocity is above maximum. If it is, the control system initiates an alarm in step 140 and continues at step 124 as shown. If the exhaust air velocity is not above maximum, the control system continues at step 124 as shown.

If in step 134, the exhaust fan is at 100% of capacity, the control system reduces supply fan speed in step 142. The control system then checks whether the supply air velocity is below minimum in step 144. If it is, the control process initiates an alarm in step 146 and returns to step 124 as shown. If the supply air velocity is not below minimum, the control system continues at step 124 as shown.

Figure 3A:
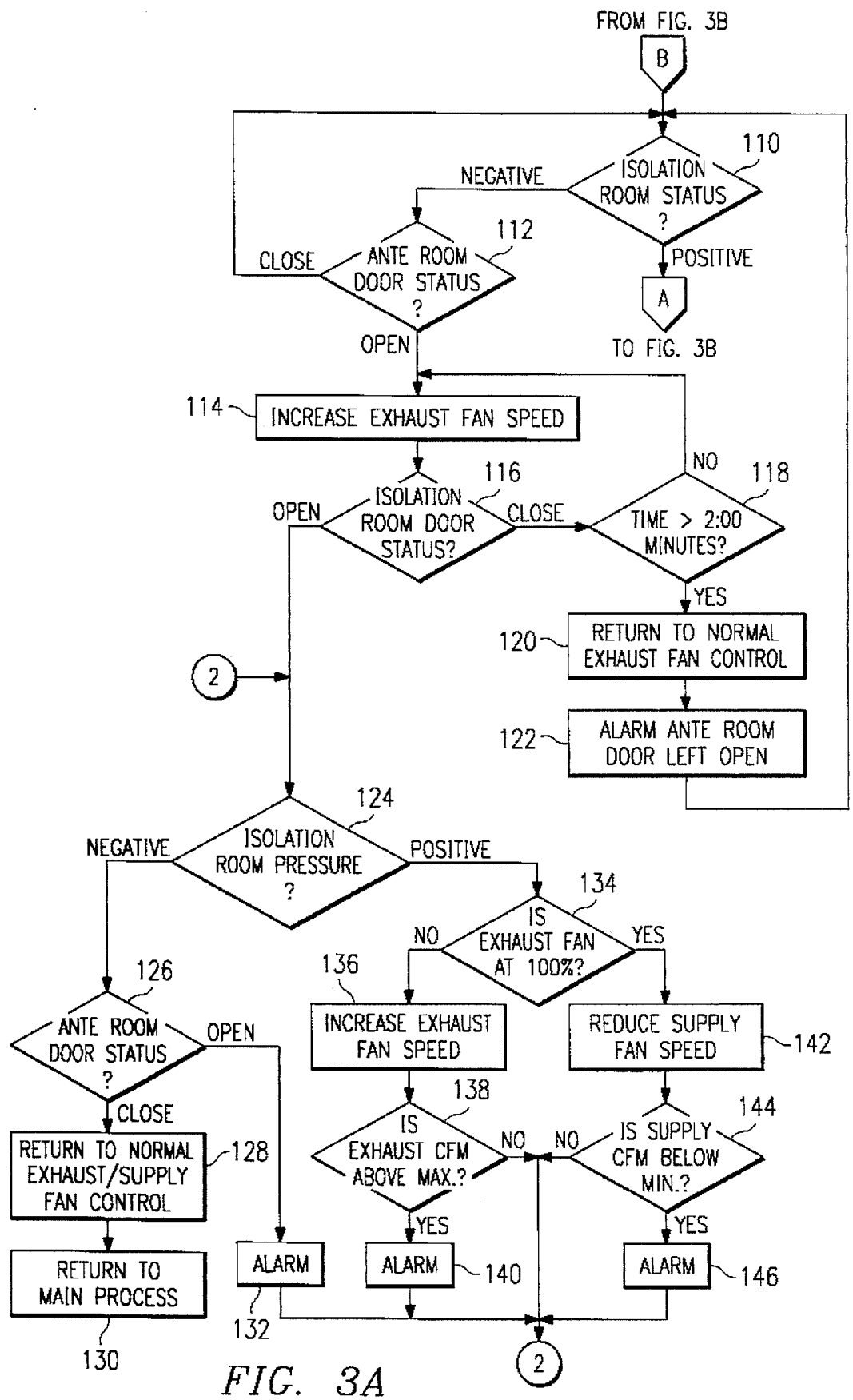
FIGS. 3A and 3B illustrate a flow chart of a door interlock process according to the teachings of the present invention.
Figure 3B:
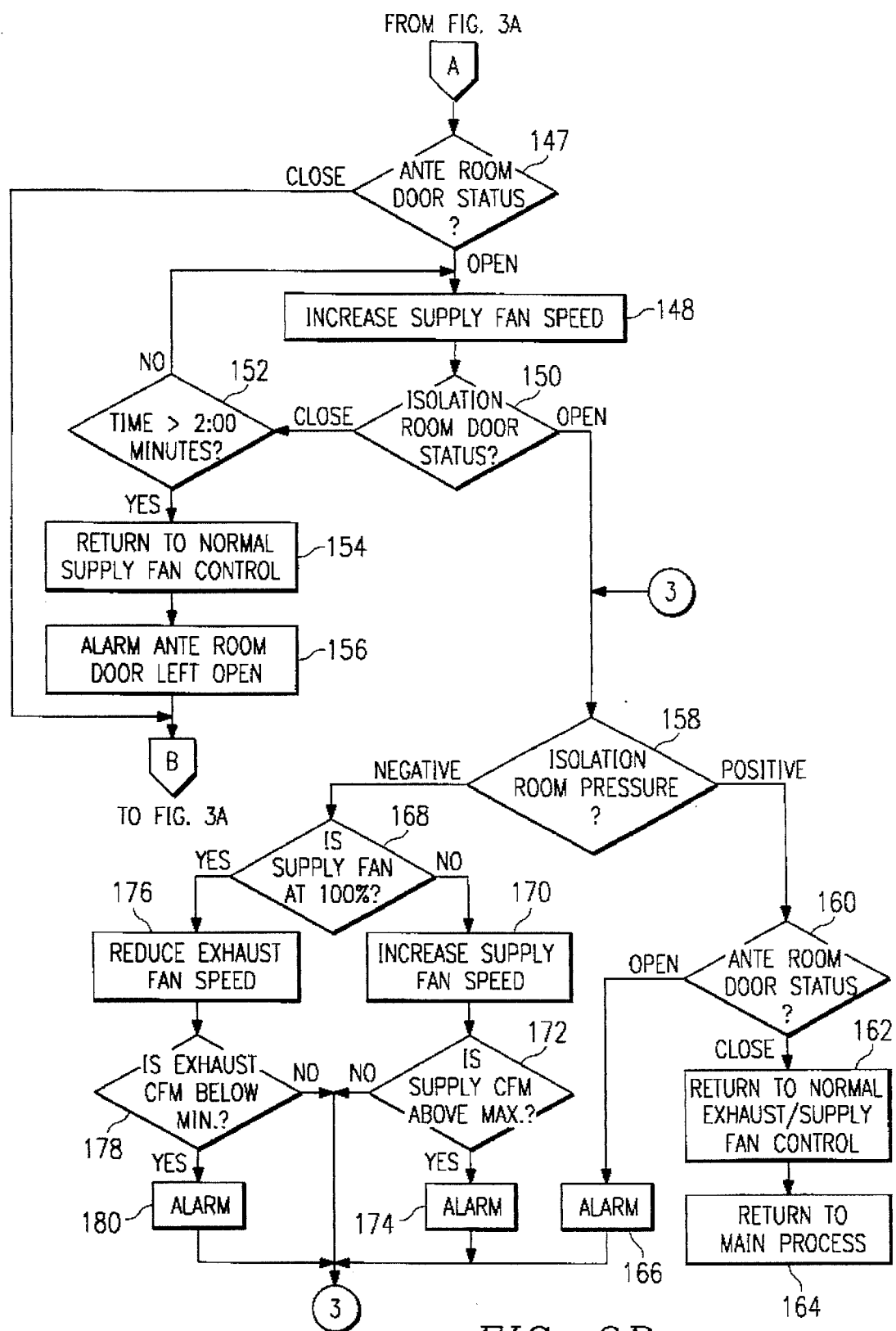

If the isolation room status is positive in step 110, the control system continues in FIG. 3B as shown by label "A". In FIG. 3B, the control system determines the anteroom door status in step 148. If the anteroom door is closed, the control system returns to FIG. 3A as shown by label "B". If the anteroom door is open, the control system increases the supply fan speed in step 148. In step 150, the control system determines whether the isolation room door status is open or closed.

If the isolation room door is closed, the control system determines whether two minutes have elapsed in step 152. If two minutes have not elapsed, the control system returns to step 148. If two minutes have elapsed, the control system returns to normal supply fan control in step 154. The control system then initiates an alarm indicating that the anteroom door has been left open in step 156. The control system returns to FIG. 3A as shown by label "B".

If the isolation room door is open in step 150, the control system determines the isolation room pressure in step 158. If the isolation room pressure is positive, the control system determines the anteroom door status in step 160. If the anteroom door status is closed, the control system returns to normal exhaust/supply fan control in step 162. In step 164, the control system returns to main room processing. If the anteroom door status is open, the control system initiates an alarm in step 166. The control system then returns to step 158 as shown by label "3".

If the isolation room pressure is negative in step 158, the control system determines whether the supply fan is at 100% of capacity in step 168. If the supply fan is not at 100%, the control system increases supply fan speed in step 170. In step 172, the control system determines whether the supply air velocity is above maximum. If it is, the control system initiates an alarm in step 174 and continues at step 158 as shown. If the supply air velocity is not above maximum, the control system continues at step 158 as shown.

If the supply fan is at 100% in step 168, the control system reduces exhaust fan speed in step 176. In step 178, the control system determines whether the exhaust air velocity is below minimum. If it is, the control system initiates an alarm in step 180 and returns to step 158 as shown. If the exhaust air velocity is not below minimum, the control system returns to step 158 as shown.

The door interlock process of FIGS. 3A and 3B allows the control system to maintain desired pressurization of the isolation room when someone enters or leaves the isolation room.

FIGS. 4A, 4B, 4C and 4D illustrate a flow chart of a fan and pressurization control process according to the teachings of the present invention. In step 182, the control system determines whether or not the control system is performing this process for the first time. If not, the control system determines the type of isolation room in step 184. If the type of isolation room is negative, the control system continues at step 196 as shown by label "1". If the type of isolation room is positive, the control system continues at step 228 of FIG. 4B as shown by label "2".

If this is the first time, the control system determines whether the type of isolation room is negative or positive in step 186. If the isolation room is positive, the control system continues in FIG. 4B as shown by label "A". If the isolation room is negative, the control system determines the room setpoint in step 188. The control system then determines the supply air velocity in step 190 and the exhaust air velocity in step 192. In step 194, the control system closes the motor contactor.

In step 196, the control system determines whether there is a variable frequency drive failure. If there is, the control system determines whether the number of reset tries is greater than three in step 198. If the number of reset tries is not greater than three, the control system resets the variable frequency drive in step 200 and returns to step 194. If the number of resets is greater than three, the control system shuts the system down in step 202. The control system then initiates an alarm in step 204. The control system then returns to its main room processing in step 206.

If there is not a variable frequency drive failure in step 196, the control system increases the frequency of the supply and exhaust motors in step 208. In step 210, the control system determines whether the supply and exhaust air velocities are at setpoints above or below deadband. If not, the control system returns to step 208. If so, the control system continues in FIG. 4C as shown by label "B".

Figure 4A:
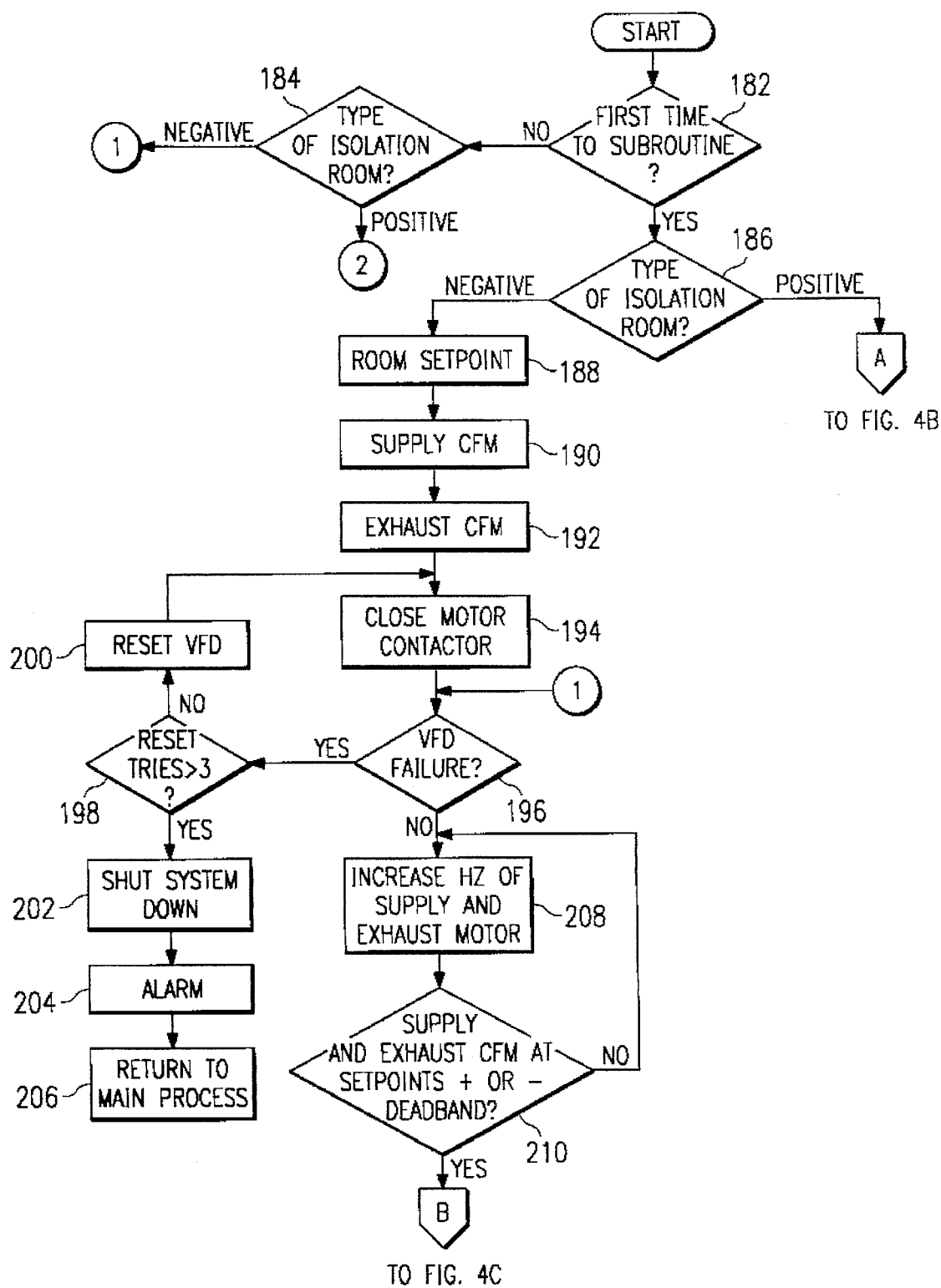
FIGS. 4A, 4B, 4C and 4D illustrate a flow chart of a fan and pressurization control process according to the teachings of the present invention.
Figure 4B:
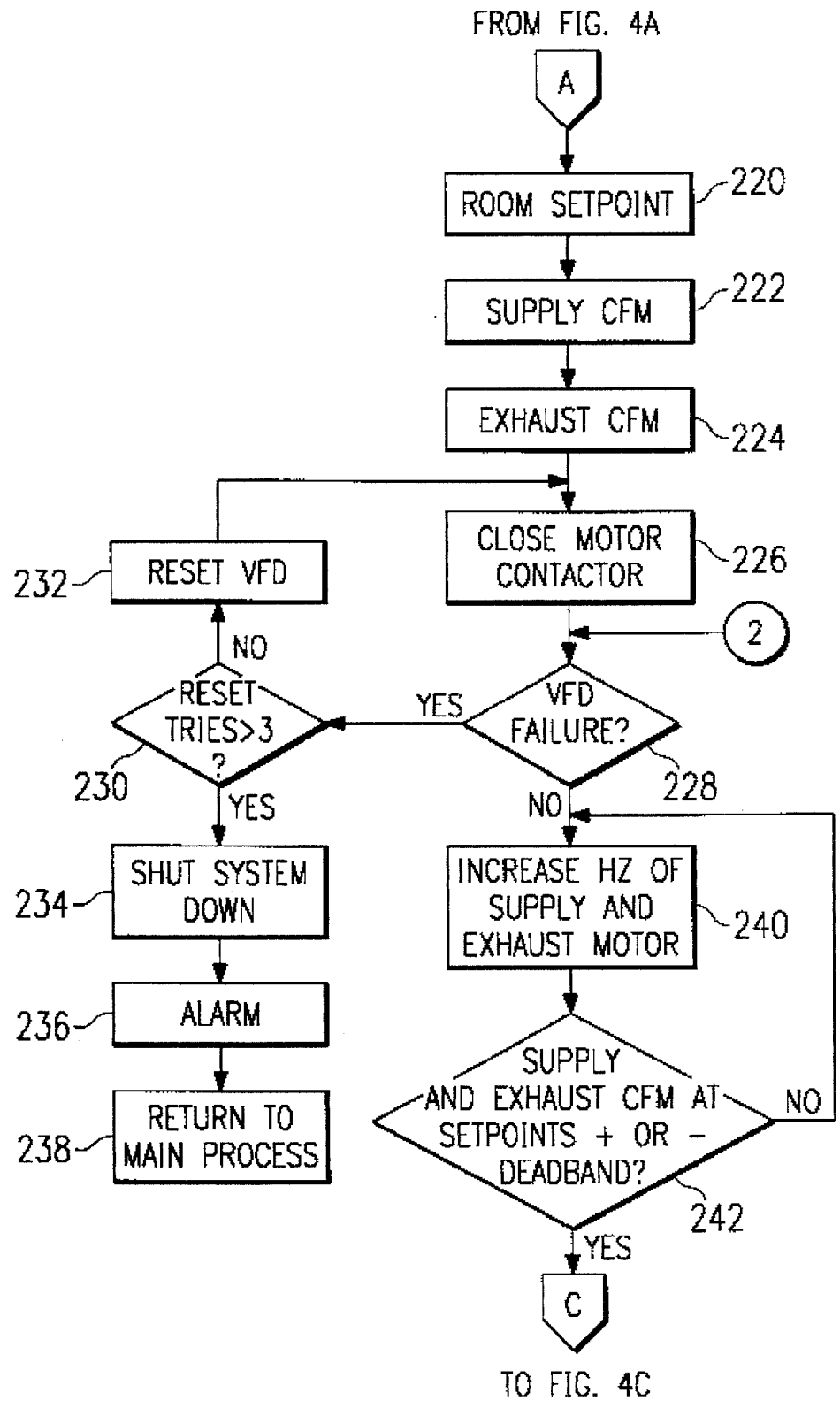

In FIG. 4B, the control system determines the room set point in step 220. The control system then determines the supply air velocity in step 222 and the exhaust air velocity in step 224. In step 226, the control system closes the motor contactor.

In step 228, the control system determines whether there is a variable frequency drive failure. If so, the control system determines whether the number of resets is greater than three in step 230. If the number of reset tries is not greater than three, the control system resets the variable frequency drive in step 232. The control system then returns to step 226. If the reset tries are greater than three, the control system shuts the system down in step 234. The control system then initiates an alarm in step 236 and returns to main room processing in step 238.

If there is not variable frequency drive failure in step 228, the control system increases the frequency of the supply and exhaust motors in step 240. In step 242, the control system determines whether the supply and exhaust air velocities are at setpoints above or below deadband. If not, the control system returns to step 240. If so, the control system continues in FIG. 4C as shown by label "C".

Figure 4C:
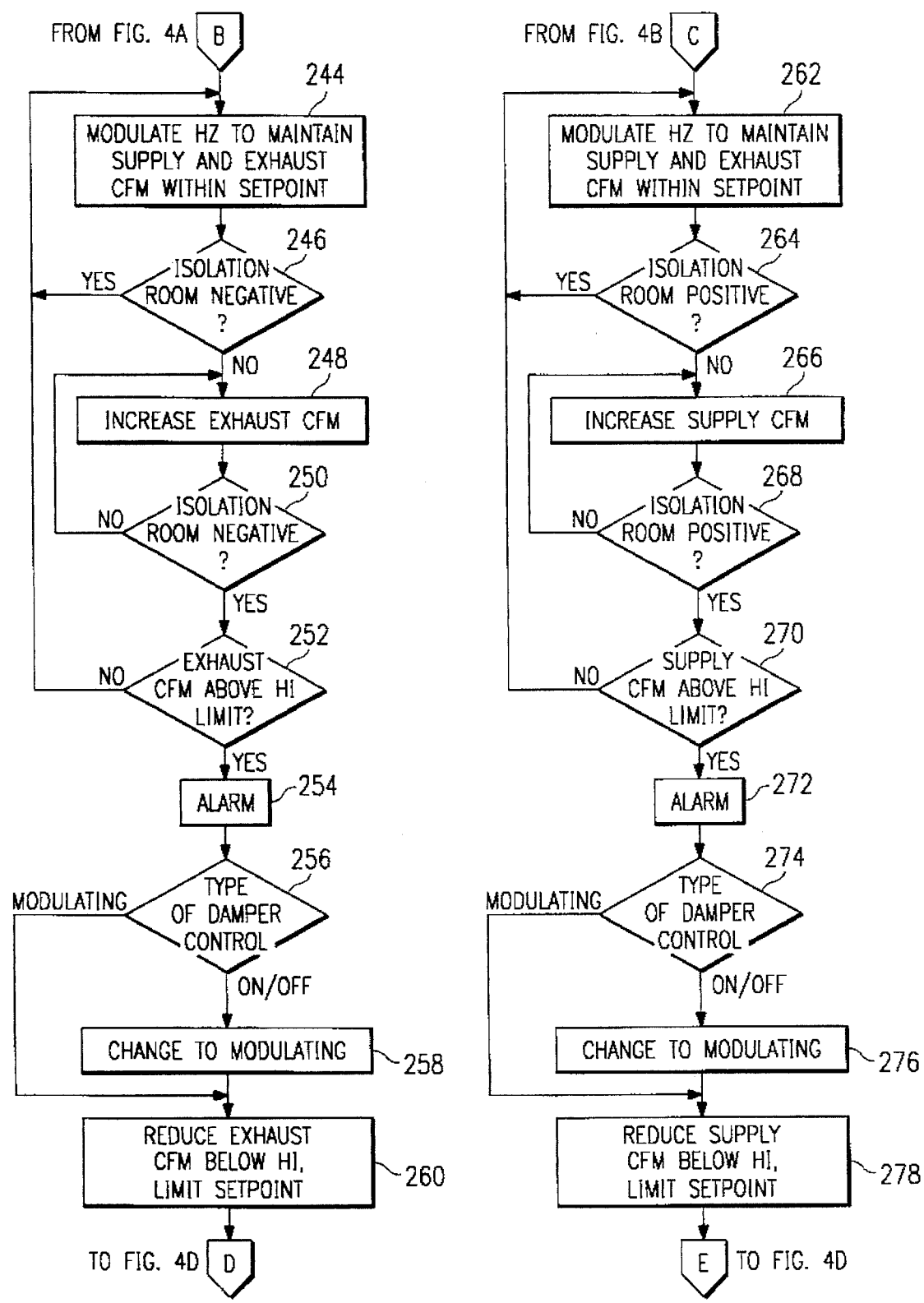

In FIG. 4C, as shown by label "B" from FIG. 4A, the control system modulates frequency to maintain supply and exhaust air velocities within setpoints in step 244. In step 246, the control system determines whether the isolation room is at negative pressure. If so, the control system returns to step 244. If not, the control system increases the exhaust air velocity in step 248.

In step 250, the control system determines whether the isolation room is at negative pressure. If not, the control system returns to step 248. If so, the control system determines whether the exhaust air velocity is above its high limit in step 252. If not, the control system returns to step 244. If so, the control system initiates an alarm in step 254.

In step 256, the control system determines the type of damper control. If the type of damper control is on/off, the control system changes to modulating in step 258. Then, in step 260, the control system reduces the exhaust air velocity below the high limit setpoint. The control system then continues in FIG. 4D as shown by label "D".

In FIG. 4C, as shown by label "C" from FIG. 4B, the control system modulates frequency to maintain supply and exhaust air velocities within setpoints in step 262. In step 264, the control system determines whether the isolation room is at positive pressure. If so, the control system continues at step 262. If not, the control system increases the supply air velocity in step 266. The control system determines in step 268 whether the isolation room is at positive pressure. If not, the control system returns to step 266. If so, the control system determines whether the supply air velocity is above its high limit in step 270. If not, the control system returns to step 262. If so, the control system initiates an alarm in step 272.

In step 274 the control system determines the type of damper control. If the type of damper control is on/off, the control system changes to modulating in step 276. In step 278, the control system reduces the supply air velocity below the high limit setpoint. The control system then continues in FIG. 4D as shown by label "E".

Figure 4D:
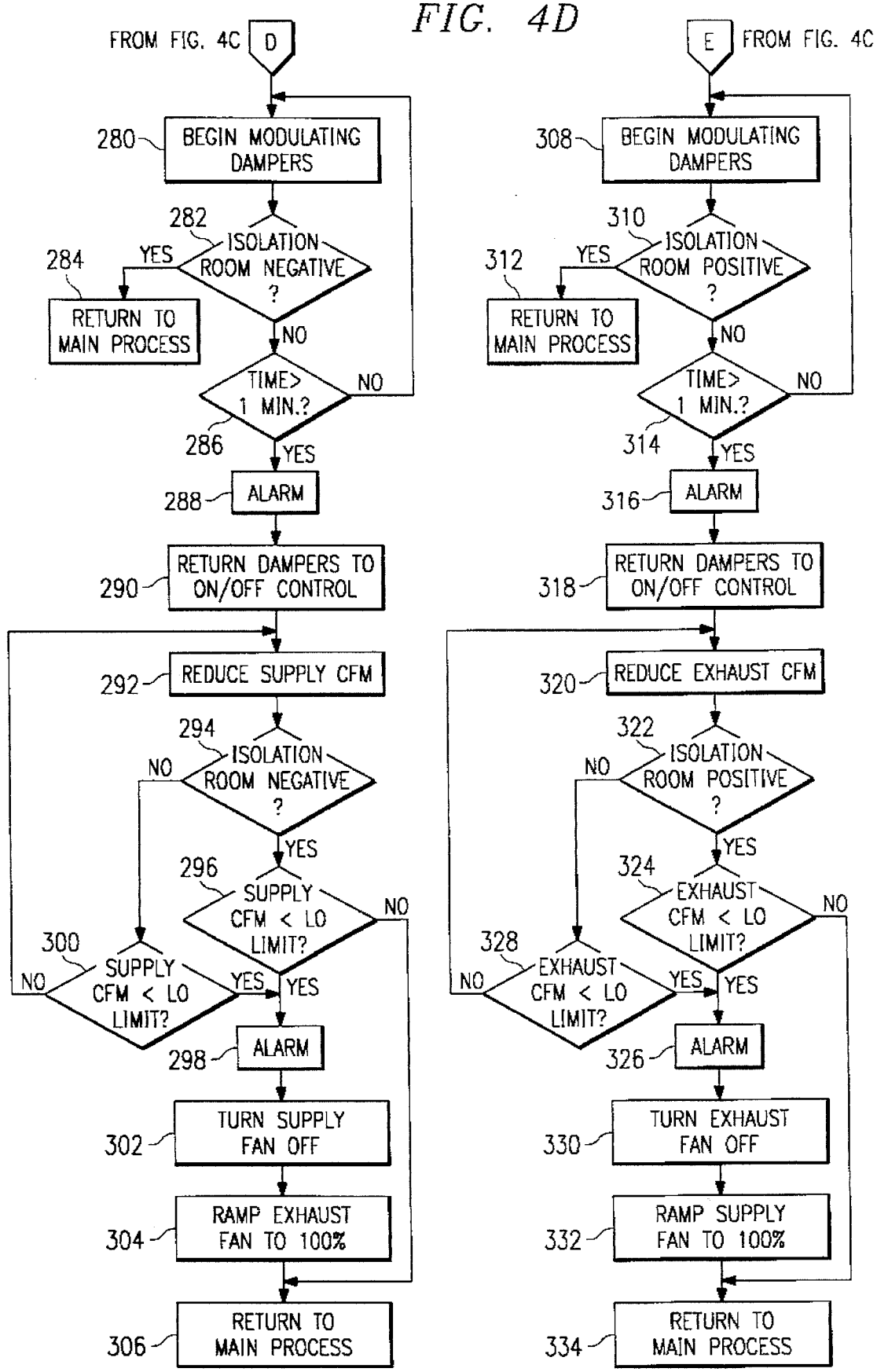

In FIG. 4D, the control system moves from FIG. 4C as shown by label "D". The control system begins modulating dampers in step 280. In step 282, the control system determines whether the isolation room is negative. If so, the control system returns to normal room processing in step 284. If not, the control system determines whether one minute has elapsed in step 286. If one minute has not elapsed, the control system returns to step 280. If one minute has elapsed, the control system initiates an alarm in step 288.

In step 290, the control system returns dampers to on/off control. In step 292, the control system reduces supply air velocity. In step 294, the control system determines whether the isolation room is negative. If so, the control system determines whether the supply air velocity is less than its lower limit in step 296. If the supply air velocity is less than its lower limit, the control system initiates an alarm in step 298.

If in step 294, the isolation room is not negative, the control system determines whether the supply air velocity is less than its lower limit in step 300. If not, the control system returns to step 292. If so, the control system initiates an alarm in step 298.

In step 302, the control system turns the supply fan off. The control system then ramps the exhaust fan to 100% of capacity in step 304. In step 306, the control system returns to main room processing. If the supply air velocity is less than its lower limit in step 296, the control system continues at step 306.

In FIG. 4D, the control system begins modulating dampers in step 308 after moving from FIG. 4C as shown by label E. In step 310, the control system determines whether the isolation room is positive. If so, the control system returns to normal room processing in step 312. If not, the control system determines whether one minute has elapsed in step 314. If one minute not elapsed, the control system returns to step 308. If one minutes has elapsed, the control system initiates an alarm in step 316.

In step 318, the control system returns dampers to on/off control. The control system then reduces exhaust air velocity in step 320. In step 322, the control system determines whether the isolation room is positive. If so, the control system determines whether the exhaust air velocity is less than its lower limit in step 324. If so, the control system initiates an alarm in step 326. If the isolation room is not positive in step 322, the control system determines whether the exhaust air velocity is less than its lower limit in step 328. If not, the control system returns to step 320. If so, the control system initiates an alarm in step 326.

In step 330, the control system turns the exhaust fan off. The control system then ramps the supply fan to 100% of capacity in step 332. In step 334, the control systems returns to main room processing. If the exhaust air velocity is not less than its lower limit in step 324, the control system continues at step 334.

The control system uses the fan and pressurization control process of FIGS. 4A, 4B, 4C and 4D to maintain control of desired pressurization of the isolation room by interconnecting control of supply fans, exhaust fans and dampers.

Although the present invention has been described in detail, it should be understood that various changes, substitutions and alterations can be made hereto without departing from the spirit and scope of the invention as defined by the appended claims.

What is claimed is:

1. A dynamic particulate control system for controlling particulate levels in an isolation rooms comprising:

a supply blower assembly having a supply blower, the supply blower assembly operable to draw outside air from outside an isolation room and operable to provide supply air to the isolation room at a supply flow rate dependent upon an operation speed of the supply blower;

a first variable frequency drive coupled to the supply blower, the first variable frequency drive operable to control the operation speed of the supply blower responsive to a first control signal;

a return blower assembly having a return blower, the return blower assembly operable to draw return air from the isolation room and operable to dissipate exhaust air outside the isolation room at an exhaust flow rate dependent upon an operation speed of the return blower;

a second variable frequency drive coupled to the return blower, the second variable frequency drive operable to control the operation speed of the return blower responsive to a second control signal;

a variable damper coupled to the return blower assembly and operable to limit the exhaust flow rate of the return air from the isolation room, the variable damper having at least two settings and operable responsive to a third control signal;

a plurality of sensors operable to periodically sample and measure a system condition and provide a status signal representing the system condition, at least one of the sensors comprising a particulate concentration sensor operable to periodically sample air inside the isolation room, measure a concentration of particulates in the sampled air, and provide a status signal representing the concentration measured; and a controller coupled to the plurality of sensors, to the first variable frequency drive, to the second variable frequency drive and to the variable damper, the controller operable to receive and process each status signal provided by each sensor, and the controller further operable, responsive to the status signal representing the concentration measured for the particulates in the isolation room, to generate and provide the first control signal, the second control signal and the third control signal to control the operation speeds of the first and second variable frequency drives and the setting of the variable damper such that particulate levels in the isolation room are dynamically controlled to remain at or below desired concentrations through exchange of air in the isolation room.

2. The system of claim 1, wherein the first variable frequency drive is further operable to provide a first status signal representing the operation speed of the supply blower to the controller, and the second variable frequency drive is further operable to provide a second status signal representing the operation speed of the return blower to the controller.

3. The system of claim 1, wherein the plurality of sensors include a door sensor operable to monitor the state of an inner door between an anteroom and the isolation room and to provide a status signal representing the state of the inner door, and wherein the controller is further operable to adjust the first control signal, the second control signal and the third control signal to compensate for the inner door being in an open state by increasing a desired pressure difference between the anteroom and the isolation room.

4. The system of claim 1, wherein the plurality of sensors further include a door sensor operable to monitor the state of an outer door of an anteroom and to provide a status signal representing the state of the outer door to the anteroom, and wherein the controller is further operable to adjust the first control signal, the second control signal and the third control signal to compensate for an expected opening of an inner door between the anteroom and the isolation room after the outer door to the anteroom is in an open state by increasing a desired pressure difference between the anteroom and the isolation room.

5. The system of claim 1, wherein the plurality of sensors further include a pressure sensor and a temperature/humidity sensor located in the isolation room.

6. The system of claim 1, wherein the supply blower assembly further comprises a pre-filter operable to filter the outside air and a post-filter operable to filter supply air, the post-filter including an ultraviolet germicidal lamp.

7. The system of claim 1, wherein the supply blower assembly further comprises a cooling unit, the cooling unit operable to provide status signals to the controller and to receive a control signal from the controller, such that the cooling unit conditions outside air drawn by the supply blower responsive to the control signal.

8. The system of claim 1, wherein the supply blower assembly further comprises a heating unit, the heating unit operable to provide status signals to the controller and to receive a control signal from the controller, such that the heating unit conditions outside air drawn by the supply blower responsive to the control signal.

9. The system of claim 1, wherein the return blower assembly further comprises a pre-filter operable to filter the return air and a post-filter operable to filter the return air, the post-filter including an ultraviolet germicidal lamp.

10. The system of claim 1, further comprising a humidifier coupled to the supply blower assembly and to the controller, the humidifier operable to receive the supply air, humidify the supply air responsive to a control signal provided by the controller, and provide the supply air to the room.

11. The system of claim 3, wherein the isolation room is desired to be at negative pressure with respect to the anteroom.

12. An isolation room system having a controlled environment, comprising:

an isolation room having an inlet for supply air and an outlet for return air;

a supply air duct coupled to the inlet of the isolation room;

a return air duct coupled to the outlet of the isolation room; and a dynamic particulate control system for controlling particulate levels in the isolation room, the dynamic particulate control system coupled to the supply air duct and to the return air duct, wherein the dynamic particulate control system comprises;

a supply blower assembly having a supply blower and coupled to the supply air duct, the supply blower assembly operable to draw outside air from outside the isolation room and operable to provide supply air to the isolation room at a supply flow rate dependent upon an operation speed of the supply blower;

a first variable frequency drive coupled to the supply blower, the first variable frequency drive operable to control the operation speed of the supply blower responsive to a first control signal;

a return blower assembly having a return blower and coupled to the return air duct, the return blower assembly operable to draw return air from the isolation room and operable to dissipate exhaust air outside the isolation room at an exhaust flow rate dependent upon an operation speed of the return blower;

a second variable frequency drive coupled to the return blower, the second variable frequency drive operable to control the operation speed of the return blower responsive to a second control signal;

a variable damper positioned in the return air duct and operable to limit the exhaust flow rate of the return air from the isolation room, the variable damper having at least two settings and operable responsive to a third control signal;

a plurality of sensors operable to periodically sample and measure a system condition and provide a status signal representing the system condition, at least one of the sensors comprising a particulate concentration sensor operable to periodically sample air inside the isolation room, measure a concentration of particulates in the sampled air, and provide a status signal representing the concentration measured; and a controller coupled to the plurality of sensors, to the first variable frequency drive, to the second variable frequency drive and to the variable damper, the controller operable to receive and process each status signal provided by each sensor, and the controller further operable, responsive to the status signal representing the concentration measured for the particulates in the isolation room, to generate and provide the first control signal, the second control signal and the third control signal to control the operation speeds of the first and second variable frequency drives and the setting of the variable damper such that particulate levels in the isolation room are dynamically controlled to remain at or below desired concentrations through exchange of air in the isolation room.

13. The system of claim 12, wherein the plurality of sensors include a door sensor operable to monitor the state of an inner door between an anteroom and the isolation room and to provide a status signal representing the state of the inner door, and wherein the controller is further operable to adjust the first control signal, the second control signal and the third control signal to compensate for the inner door being in an open state by increasing a desired pressure difference between the anteroom and the isolation room.

14. The system of claim 13, further comprising:

an anteroom having an inlet for supply air coupled to the supply air duct and an outlet for return air coupled to the return air duct and having the inner door;

a second variable damper positioned in the return air duct and operable to limit the exhaust flow rate of the return air from the anteroom, the second variable damper having at least two settings and operable responsive to a fourth control signal provided by the controller; and the controller further operable to adjust the fourth control signal to compensate for the inner door being in the open state.

15. The system of claim 12, wherein the plurality of sensors further include a door sensor operable to monitor the state of an outer door of the anteroom and to provide a status signal representing the state of the outer door to the anteroom, and wherein the controller is further operable to adjust the first control signal, the second control signal and the third control signal to compensate for an expected opening of an inner door between the anteroom and the isolation room after the outer door to the anteroom is in an open state by increasing a desired pressure difference between the anteroom and the isolation room.

16. The system of claim 12, wherein the plurality of sensors further include a pressure sensor and a temperature/humidity sensor located in the isolation room.

17. The system of claim 15, further comprising:

an anteroom having an inlet for supply air coupled to the supply air duct and an outlet for return air coupled to the return air duct and having the outer door;

a second variable damper positioned in the return air duct and operable to limit the exhaust flow rate of the return air from the anteroom, the second variable damper having at least two settings and operable responsive to a fourth control signal provided by the controller; and the controller further operable to adjust the fourth control signal to compensate for the outer door being in the open state.

18. A method of operating a dynamic particulate control system for control of particulate levels in an isolation room, comprising:

monitoring a plurality of system conditions using a plurality of sensors including a particulate concentration sensor used periodically to sample air inside the isolation room and measure a concentration of particulates in the sampled air;

providing status signals to a controller representing the system conditions including a status signal representing the concentration measured by the particulate concentration sensor;

generating, using the controller, a plurality of control signals responsive to the concentration measured for the particulates in the isolation room;

providing the plurality of control signals to a supply blower assembly, a return blower assembly, and a variable damper to control air flow and processing of air in the isolation room; and repeating periodically the steps of monitoring, providing, generating and providing to dynamically control the particulate levels of the isolation room through exchange of air in the isolation room.

19. The method of claim 18, wherein the system conditions include conditions in a negative pressure isolation room in a health care facility.

20. The method of claim 18, wherein monitoring and providing status signals include a door sensor monitoring the state of an inner door between an anteroom and the isolation room and providing a status signal representing the state of the inner door, and wherein generating a plurality of control signals includes adjusting the control signals to compensate for the inner door being in an open state by increasing a desired pressure difference between the anteroom and the isolation room.

21. The method of claim 18, wherein monitoring and providing status signals include a door sensor monitoring the state of an outer door of an anteroom and providing a status signal representing the state of the outer door, and wherein generating a plurality of control signals includes adjusting the control signals to compensate for the door being in an open state by increasing a desired pressure difference between the anteroom and the isolation room.

* * * * *